(12) United States Patent
Yee et al.

(10) Patent No.: US 9,392,006 B2
(45) Date of Patent: Jul. 12, 2016

(54) METHOD AND APPARATUS FOR MANAGEMENT AND TROUBLESHOOTING OF A PROCESSING SYSTEM

(71) Applicant: NetApp, Inc., Sunnyvale, CA (US)

(72) Inventors: Steven D. Yee, Sunnyvale, CA (US); Rod Bagg, San Jose, CA (US); Michael E. Powers, San Jose, CA (US); Joseph A. Thomson, San Jose, CA (US); Richard L. Ehrhart, San Jose, CA (US); James M. Korntved, Prunedale, CA (US); Brian M. Hackworth, San Jose, CA (US); Pradeep Kalra, San Jose, CA (US); Diptish Datta, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 189 days.

(21) Appl. No.: 14/255,732

(22) Filed: Apr. 17, 2014

(65) Prior Publication Data

US 2014/0317743 A1    Oct. 23, 2014

Related U.S. Application Data

(63) Continuation of application No. 11/258,628, filed on Oct. 25, 2005, now Pat. No. 8,745,199.

(60) Provisional application No. 60/686,653, filed on Jun. 1, 2005.

(51) Int. Cl.
    *H04L 29/06* (2006.01)
    *H04L 12/26* (2006.01)
    *H04L 29/14* (2006.01)

(52) U.S. Cl.
    CPC ............ *H04L 63/1416* (2013.01); *H04L 43/08* (2013.01); *H04L 63/061* (2013.01); *H04L 63/102* (2013.01); *H04L 69/40* (2013.01)

(58) Field of Classification Search
    None
    See application file for complete search history.

(56) References Cited

U.S. PATENT DOCUMENTS

| 6,681,348 | B1* | 1/2004 | Vachon ............... G06F 11/0778 714/38.11 |
| --- | --- | --- | --- |
| 7,219,144 | B2 | 5/2007 | Matsuki et al. |
| 7,415,509 | B1 | 8/2008 | Kaltenmark et al. |
| 2003/0028825 | A1* | 2/2003 | Hines .................. G06F 11/2294 714/37 |
| 2004/0019894 | A1 | 1/2004 | Willard et al. |
| 2004/0066797 | A1* | 4/2004 | Shima ................. H04L 63/0823 370/465 |
| 2004/0267926 | A1 | 12/2004 | Rothman et al. |
| 2005/0210077 | A1 | 9/2005 | Balakrishnan et al. |
| 2005/0228769 | A1 | 10/2005 | Oshima et al. |
| 2005/0289404 | A1 | 12/2005 | Maguire |
| 2006/0136784 | A1 | 6/2006 | Prescott et al. |
| 2006/0271656 | A1 | 11/2006 | Yagawa |

FOREIGN PATENT DOCUMENTS

EP    1215578    6/2002

* cited by examiner

*Primary Examiner* — Sulaiman Nooristany
(74) *Attorney, Agent, or Firm* — Klein, O'Neill & Singh, LLP

(57) ABSTRACT

The present invention includes an apparatus connected to a processing system including a data collector to gather and store data regarding operation of the processing system, a device relationship manager to send data regarding the operation of the processing system to a remote administrative console, and a security policy manager to control the sending of data regarding the operation of the processing system by the device relationship manager to the remote administrative console based on a security policy.

20 Claims, 12 Drawing Sheets

METHOD AND APPARATUS FOR MANAGEMENT AND TROUBLESHOOTING OF A PROCESSING SYSTEM

This application is a continuation application of U.S. patent application Ser. No. 11/258,628, which was filed on Oct. 25, 2005 and claims the benefit of U.S. Provisional Patent Application No. 60/686,653 filed on Jun. 1, 2005, all of which are incorporated by reference herein in their entirety.

TECHNICAL FIELD

At least one embodiment of the present invention pertains to management and troubleshooting of a processing system and more particularly, to an apparatus for secure remote management and troubleshooting of a processing system.

BACKGROUND

In many types of computer networks, it is desirable to be able to perform certain management related functions on a processing system from a remote location. For example, a business enterprise may operate a large computer network that includes numerous client and server processing systems (hereinafter "clients" and "servers", respectively). With such a network, it may be desirable to allow a network administrator to perform or control various functions on the clients and/or servers from a remote console via the network, such as monitoring various functions and conditions in these devices, configuring the devices, performing diagnostic functions, debugging, software upgrades, etc. To facilitate explanation such functions are referred to collectively and in as "management functions".

One particular application in which it is desirable to have this capability is in a storage-oriented network, i.e., a network that includes one or more storage servers that store and retrieve data on behalf of one or more clients. Such a network may be used, for example, to provide multiple users with access to shared data or to backup mission critical data. An example of such a network is illustrated in FIG. 1.

In FIG. 1, a storage server 20 is coupled locally to a storage subsystem 4, which includes a set of mass storage devices, and to a set of clients 1 through a network 3, such as a local area network (LAN), a wide area network (WAN), a Global Area Network (GAN) such as the Internet, or other type of network or a combination of networks.

The storage server 20 operates on behalf of the clients 1 to store and manage shared files or other units of data (e.g., blocks) in the set of mass storage devices. Each of the clients 1 may be, for example, a conventional personal computer (PC), workstation, or the like. The storage subsystem 4 is managed by the storage server 20. The storage server 20 receives and responds to various read and write requests from the clients 1, directed to data stored in, or to be stored in, the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The may storage devices may be organized into one or more volumes of Redundant Array of Inexpensive Disks (RAID).

Also shown in FIG. 1 is an administrative console 5 coupled to the storage server 20. The storage server 20 in this configuration includes a communication port (e.g., RS-232) and appropriate software to allow direct communication between the storage server 20 and the administrative console 5 through a transmission line. However, administrative console 5 may alternatively be connected to the storage server 20 via a network, such as network 3. These configurations enable a network administrator to perform at least some of the types of management functions mentioned above on the storage server 20. Filer products made by Network Appliance, Inc. of Sunnyvale, Calif., are an example of storage servers that have this type of capability.

However, in many network environments, the network administrator may not be able to perform all management functions, especially such functions as identifying potential problems before they occur and troubleshooting potential or existing problems. This may be because the network administrator may not have a complete understanding of certain processing systems on the network, which are ordinarily manufactured by third parties, such as Network Appliance, Inc. Often, in order to solve hardware and software issues with the processing systems, the network administrator must contact the third party manufacturer.

Some prior art storage management software can collect data regarding operation of the processing system so as to identify any potential problems based on preset thresholds. The software may also cause a notification to be sent to a network administrator in case a problem is identified. Filer products made by Network Appliance, Inc. of Sunnyvale, Calif., are an example of storage servers that send such auto-support messages to a preset network administrator in case there is a problem. However, usually, in order to troubleshoot, a customer support engineer at the third party manufacturer site goes through a troubleshooting algorithm on the phone with the network administrator, during which the customer support engineer asks the network administrator to input various commands to the storage server until the problem is diagnosed. This process can be very lengthy and may contribute to downtime of the storage server.

It may be desirable, therefore, to allow a third party, such as the third party manufacturer, to have remote access to the processing system to enable troubleshooting of the processing system, while maintaining the security of data about the processing system being communicated to the third party and the processing system. Further, it may be desirable to ensure that the third party does not exceed its access privileges.

SUMMARY OF THE INVENTION

The present invention includes an apparatus connected to a processing system in a data collector to gather and store data regarding operation of the processing system, a device relationship manager to send data gathered by the data collector to a remote administrative console, and a security policy manager to control the sending of data regarding the operation of the processing system based on a security policy.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A secure remotely accessible monitoring an management station that supports automated and manual troubleshooting of a processing system is described. In accordance with certain embodiments of the invention, as described in greater detail below, a monitoring and management station, called a "support console" herein, collects data regarding the operation of a processing system such as a storage server and monitors the processing system. The support console automatically provides notification to a remote administrative console of impending problems with the processing system and enables interactive diagnosis and troubleshooting. Further, the support console provides support for analyzing a core file of the processing system, which contains a memory image of a process at the time of an error, to enable debugging rare or complex problems with the processing system in which a core file is created. The support console reduces time required for data collection, problem recognition and diagnosis core file analysis and troubleshooting of the processing system by providing remote access to the data, core file and the processing system, while maintaining a high level of security and observing limitations by a network administrator of the processing system on the access by the remote administrative console.

Figure 2:
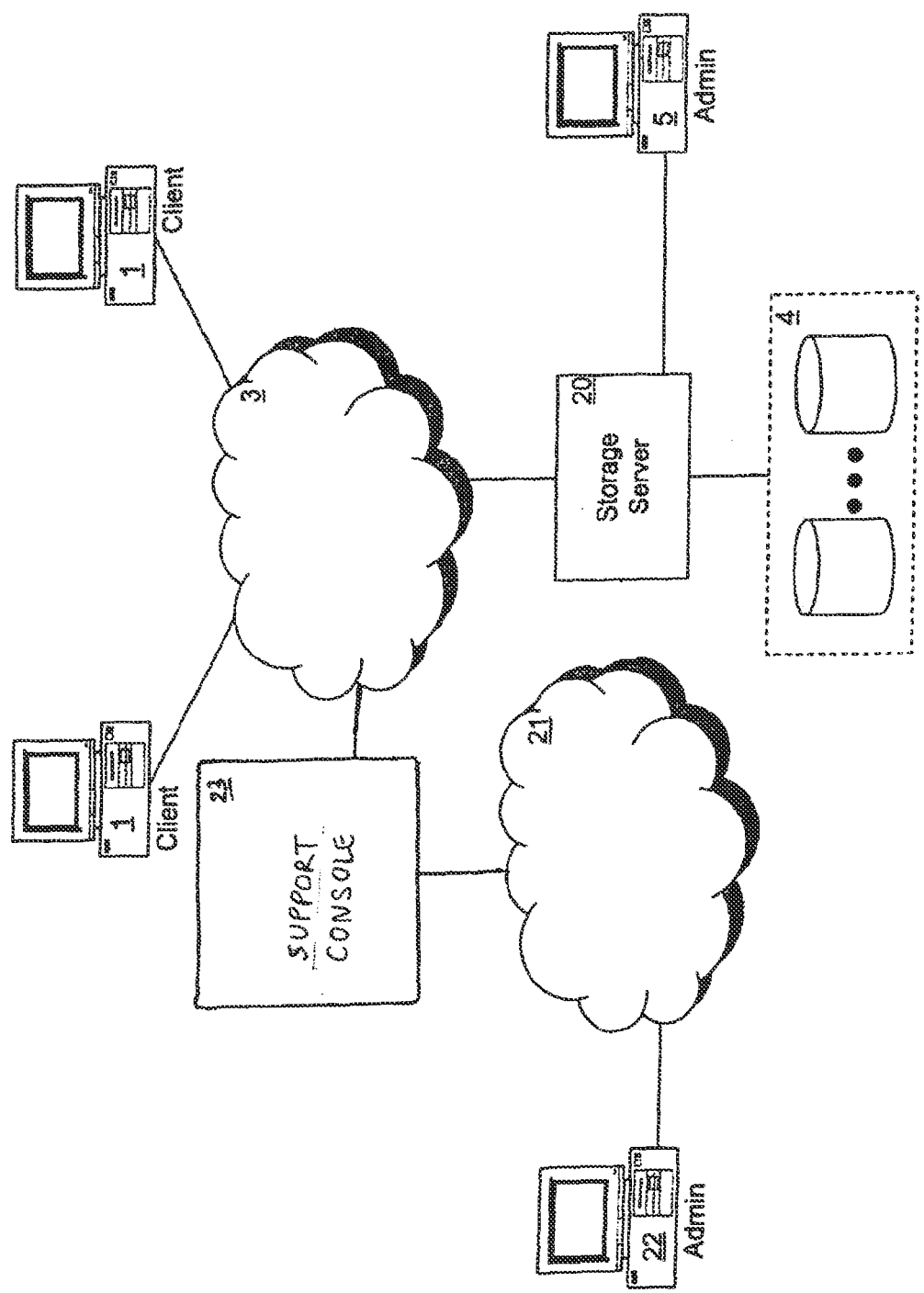
FIG. 2 illustrates a network environment which includes a storage server that can be managed remotely from an administrative console over a network.

An example of a network configuration in which the support console can be employed is shown in FIG. 2. As shown in FIG. 2, the processing system to be remotely managed is a storage server 20. One example of such a storage server is a filer product made by Network Appliance, Inc. However, it will be recognized that the technique introduced herein can also be applied to essentially any other type of network-connected processing system, such as a SAN host, a switch, a network caching appliance such as NETCACHE®, a host bus adapter, a Fabric Attached Storage (FAS) device and so on. A NETCACHE® is an appliance designed and manufactured by Network Appliance, Inc. to serve Internet and intranet content quickly and reliably. NETCACHE® is a registered trademark of Network Appliance, Inc. Storage server 20 can be a file server (e.g., a Filer), a Storage Area Network (SAN) based server, and so on.

Figure 1:
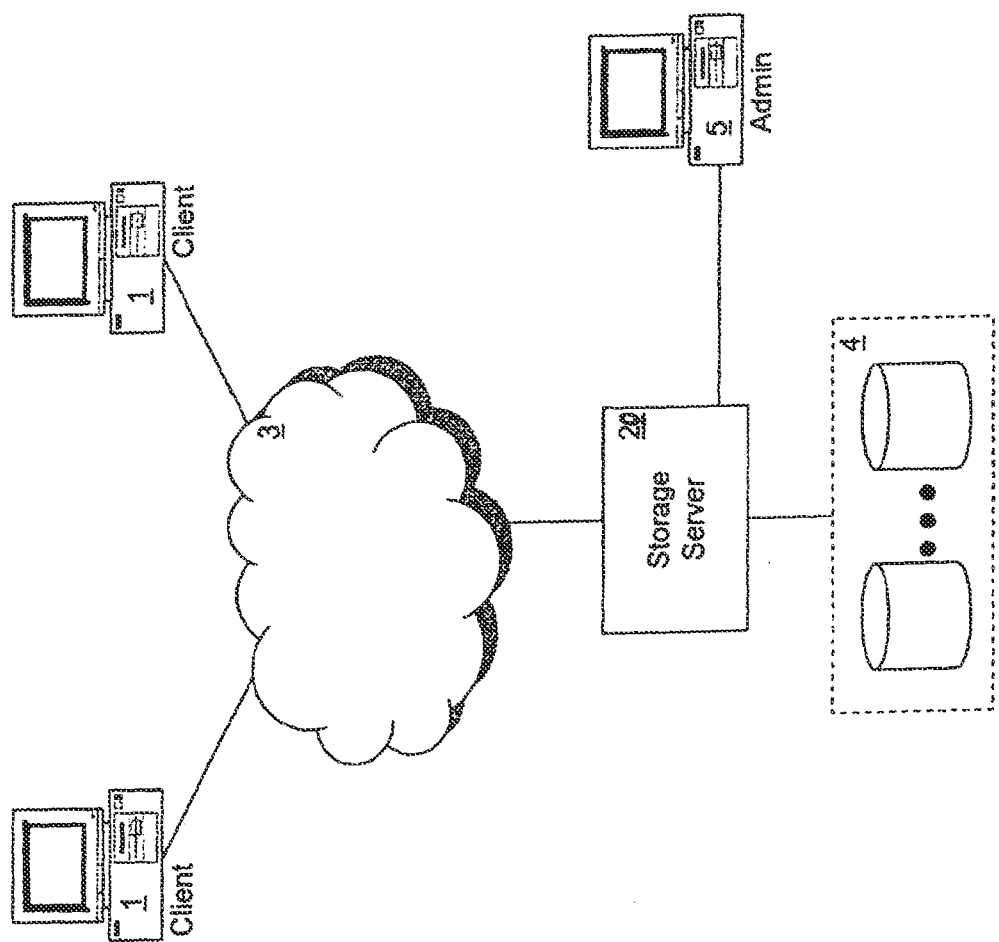
FIG. 1 illustrates a network environment includes a storage server managed from an administrative console.

The configuration of FIG. 2 is similar to that of FIG. 1, except that the storage server 20 can be managed through a network 21 from a remote administrative console 22 with the aid of the support console 23, in addition to being capable of being managed through the direct serial interface by local administrative console 5. As shown in FIG. 2, the support console 23 is connected to the storage center 20 via network 3; however, it will be recognized that support console 23 can be connected to the storage server 20 in other ways, such as via another network, or directly to the storage server through the direct serial interface. The remote administrative console 22 can be connected to the support console 23 via network 21, which may be, for example, a local area network (LAN), a wide area network (WAN), a Global Area Network (GAN) such as the Internet, or other type of network or a combination of networks. Further, although not shown in FIG. 2, the remote administrative console 22 can be connected to the support console 23 is network 3. In one embodiment, remote administrative console 22 is managed by an enterprise of the manufacturer of the storage server 20. Also, although not shown in FIG. 2, the support console 23 can be connected to multiple processing systems, including other support consoles.

Figure 3:
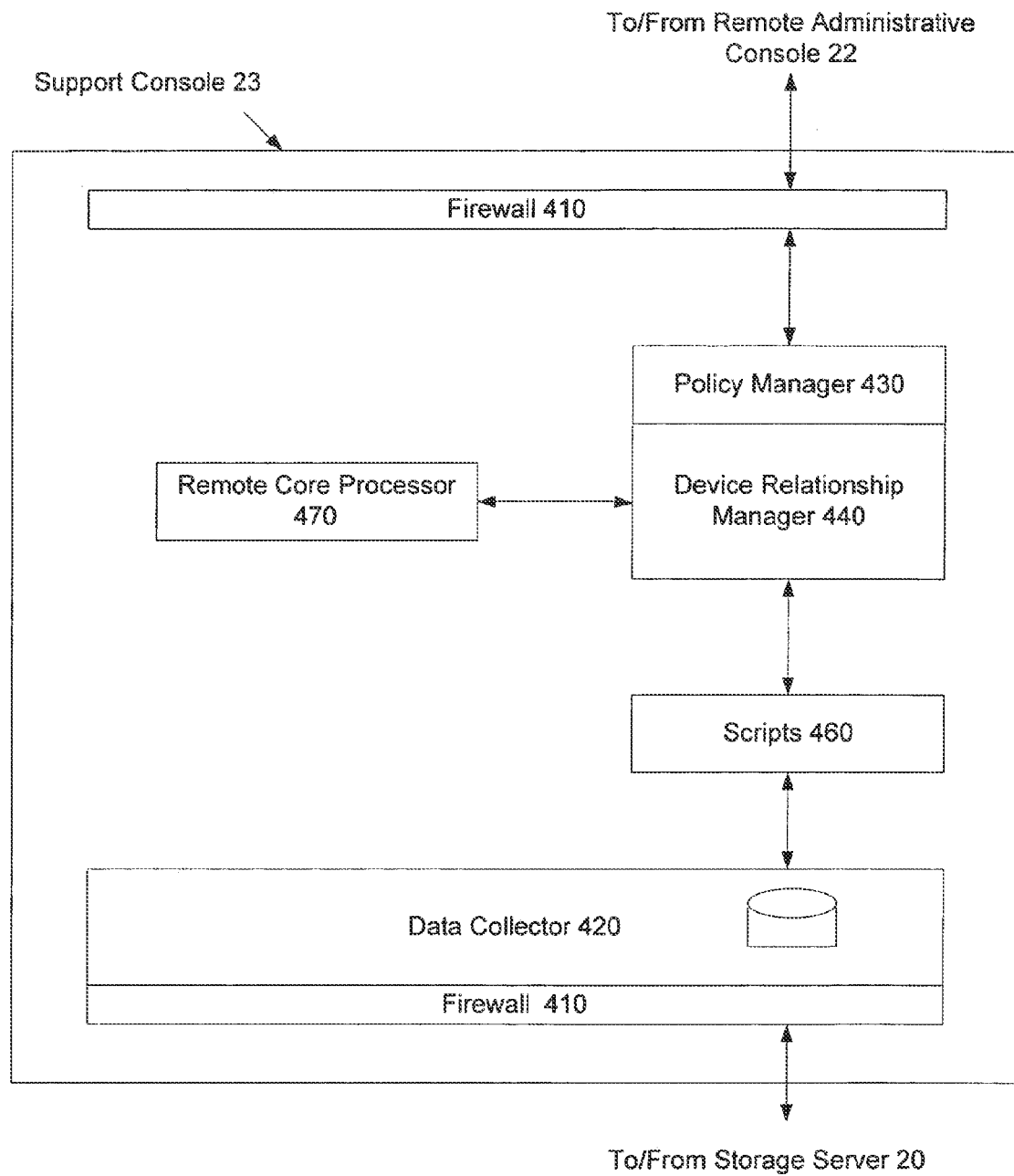
FIG. 3 is a block diagram showing relevant software components of the support console, according to an embodiment of the invention.

FIG. 3 is a high-level block diagram showing the relevant software components of the support console 23, according to certain embodiments of the invention. The support console 23 includes a data collector 420, a device relationship manager 440, a security policy manager 430, a remote core processor 470, and one or more script files 460.

The data collector 420 collects data regarding operation of the storage server 20. The device relationship manager 440 sends data regarding the operation of the processing system gathered by the data collector to the remote administrative console 22. The security policy manager 430 controls actions performed by the device relationship manager 440 by implementing policies set up by a user of the storage server 20 having administrative privileges, such as a network administrator. The remote core processor 470 gathers relevant chunks of the core file collected by the data collector 420 to be sent to the emote administrative console 22. Script files 460 contain scripts that can be executed by the device relationship manager 440.

Figure 4:
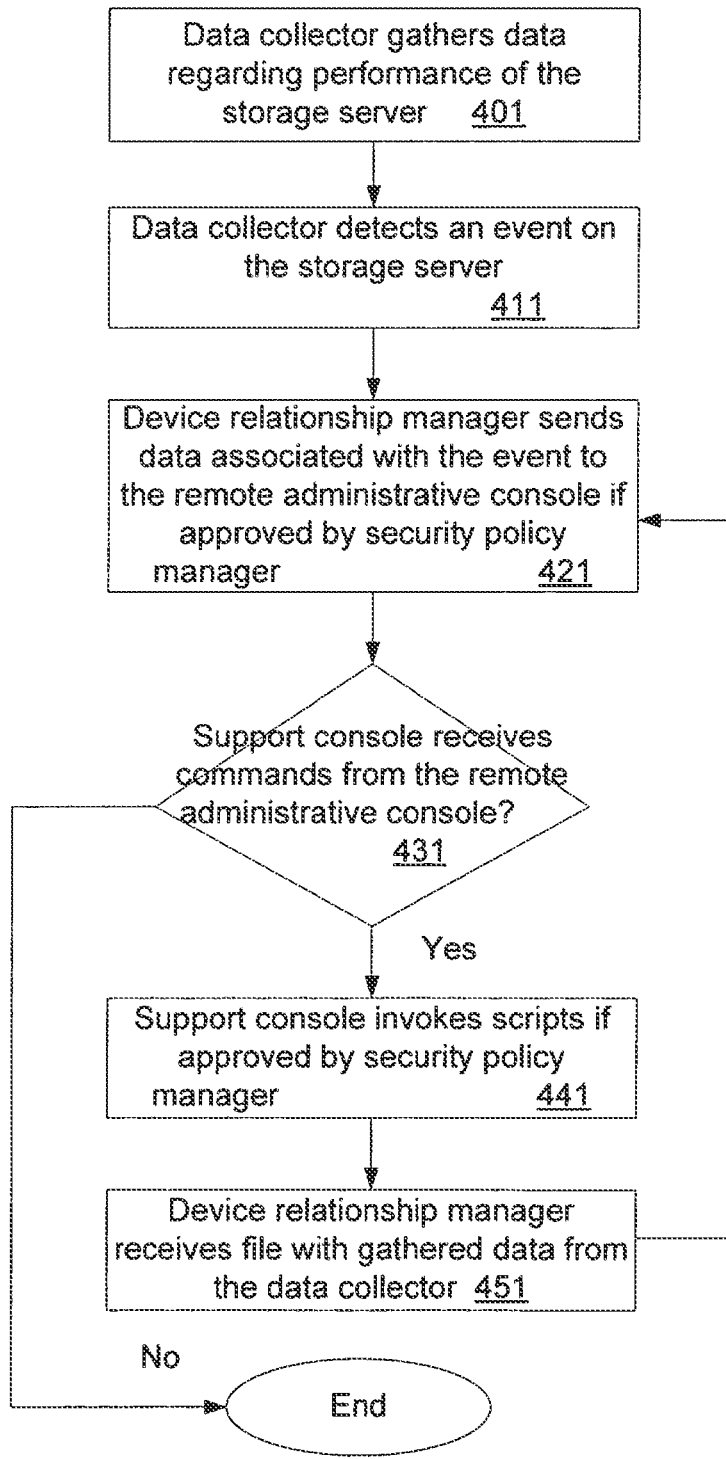
FIG. 4 is a flew diagram of the support console providing data to the remote administrative console for proactive troubleshooting.

In accordance with certain embodiments of the invention, as illustrated in FIG. 4, the support console 23 provides the remote administrative console 22 with information to enable proactive diagnosis of potential and current problems with the storage server 20 so as to enable troubleshooting of problems quickly if and when they do occur. At block 401, the data collector 420 gathers and stores data regarding operation of the storage server 20. At block 411, the data collector 420 compares the gathered data with threshold data to detect anomalies in the gathered data. Such an anomaly, called an "event" herein, may indicate current or future problems with the storage server 20. An event may occur, e.g., when a storage server 20 fails, a switch goes offline or becomes faulty, an HBA does not respond. The data collector 420 notifies the device relationship manager 440 of the event. In one embodiment, the data collector 420 also creates and sends a file with the data associated with the event to the device relationship manager 440. In an alternative embodiment, instead of the data collector 420 notifying the device relationship manager 440 of the event, the device relationship manager 440 polls for files, e.g. cookie files, created by the data collector 410 upon detection of an event. When such a file is detected, the device relationship manager 440 sends data associated with the event to the remote administrative console 22 and deletes the cookie.

At block 421, upon the notification from data collector 420 of the event, the device relationship manager 440 sends the data associated with the event to the remote administrative console 22, such that the remote administrative console 22 can conduct further diagnosis of the problem, and troubleshoot the problem. In one embodiment, communication between the device relationship manager 440 and remote administrative console 22 is checked by a security policy manager 430, which implements security policies established by a user of the storage server 20. Accordingly, only those communications that are approved by the user of the storage sever 20 are allowed. In this way, the support console 23 functioning to notify the remote administrative console 22 of impending or current problems with the storage server 20.

At block 431, the support console 23 receives commands from the remote administrative console 22. In one embodiment, the commands are generated by the remote administrative console 22 upon receipt and review of data associated with an event received from the support console 23. Data associated with the event is discussed below.

At block 441, the support console 23 interprets the commands to invoke one or more scripts stored in script files 460. In one embodiment, scripts are written in PERL and stored in script files 460 having a ".seq" extension. For instance, invoking a script file "get-resources.seq" containing the script "gateway/scripts/run-resouces.sh" fetches basic configuration information, such as date, version, and so on. Besides being stored in script files 460, scripts may be contained in the command from the remote administrative console 22. Also, in another embodiment, scripts can be invoked on the support console 23 using a command line interface (CLI) of the support console 23. Further, according to one embodiment, the invoked scripts are checked by the security policy manager 430 to determine if the execution of the scripts is authorized.

It authorized, the support console 23 executes the scripts to cause the data collector 420 to gather specific data associated with the storage server 20, as may be necessary to troubleshoot the problems with the storage server 20. At block 451, the device relationship manager 440 receives a file with the gathered data from the data collector 420. Control passes to block 421 where the device relationship manager 440 sends the gathered data to the remote administrative console 22, so that the remote administrative console 22 can conduct further diagnosis of the problem.

In accordance with certain embodiments of the invention, the support console 23 also enables troubleshooting of the storage server 20. Accordingly, when a detected event is a problem with the hardware of the storage server 20, the support console 23 may be configured to notify a provider of hardware to dispatch replacement parts to the user of the storage server 20.

In accordance with certain embodiments of the invention, the support console 23 also enables troubleshooting of the storage server 20 by the remote administrative console 22 by supporting a remote between the remote administrative console 22 and the storage server 20. Upon the start of a remote session by the remote administrative console 22, the support console 23 allows data to be sent back and forth to the remote administrative console 22 without interpretation by the device relationship manager 440. Further, the support console 23 may mediate a command line session on the support console 23 or a monitored processing system, such as storage server 20, that is initiated by a user of the storage server 20 as a remote terminal session and joined in by the remote administrative console 22. In one embodiment, the remote session must be approved by a user of the storage server 20, for instance, by using the security policy manager 430.

Figure 5:
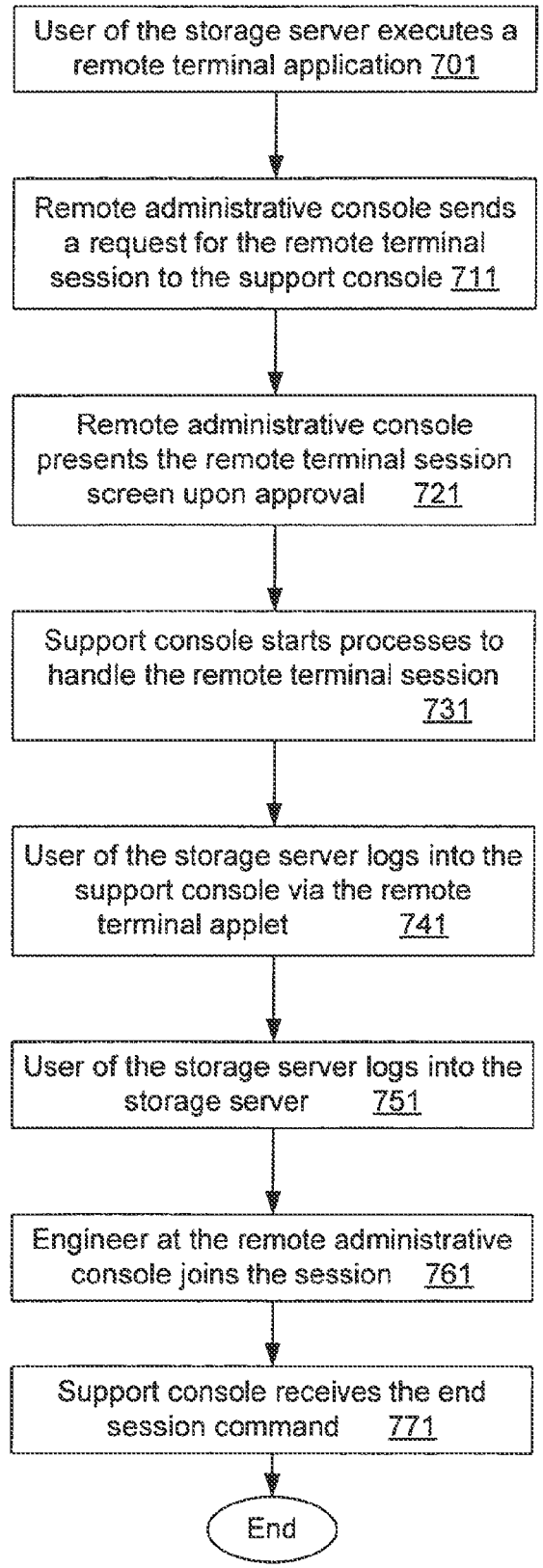
FIG. 5 is a flow diagram of the support console supporting troubleshooting of the storage server by the remote administrative console by a mediated remote access session.

In accordance with certain embodiments of the invention, as illustrated in FIG. 5, the support console 23 supports troubleshooting the storage sever 20 by the remote administrative console 22 by mediating a remote session between the remote administrative console 22 and storage server 20. At block 701, a user of the storage server 20 executes a remote terminal application, such as by using a Java-based remote terminal apples. The communication between the application and the remote administrative console 22 is over a Secure Sockets Layer (SSL) encrypted connection. At block 711, the remote administrative console 22 queues up a request for the remote terminal session to be sent to the support console 23 on its next contact with remote administrative console 22. In one embodiment, the next contact with the support console 23 may be when the support console 23 send a communication, as discussed below in reference to FIG. 8A. At block 721, the remote administrative console 22 updates the Java applet to present the remote terminal session screen, awaiting a login prompt, it the support console 23 receives customer approval for this session. In one embodiment, the session is approved via the security policy manager 430, as described below in FIG. 9.

At block 731, the support console 23 starts processes to handle the remote terminal session and increases the frequency of a communication, called a "heartbeat connection" herein, to the remote administrative console 22. At block 41, the support console 23 command line log-in prompt appears in the remote terminal applet. The user logs into the support console 23 via the remote terminal applet. It is to be noted that the user as described herein is a user with greater privileges than an ordinary user, such as network administrator. In one embodiment, the password input for this account is not visible to a support engineer at the remote administrative console 2. At block 751, from the support console 23 shell, the user logs into the storage server 20. In one embodiment, the user logs in using Secure Shell (SSH). At block 761, the support engineer at the remote administrative console joins the session. The remote administrative console 22 will start the remote terminal applet on the support engineer's workstation. During the session, if the user wants to allow the support engineer to type commands to the storage server 20, he can grant the control using the remote terminal applet. The remote administrative console 22 queues up a message for the support console 23 to end the session. At block 771, the support console 23 receives the end session command, terminates the processes supporting the remote session and restores the lower heartbeat rate.

In one embodiment of the present invention, the data collector 420 is configured to gather data regarding operation of the storage server 20. Examples of kinds of data that may be collected by the data collector 420 include data associated with storage server 20 failure, volume threshold, processor utilization threshold, and so on. For instance, a data type "Appliance_Down" may be collected by the data collector 420. This data type indicates whether the storage server 20 is down. A data type "corefile" indicates whether a core file exists. Similar data may also be collected by the data collector 420 from the support console 23 on which it runs or from other support consoles. In one embodiment, the data collector 420 is configured to collect data at regular intervals for trend and threshold analysis. The data collector 420 stores collected data in a database.

In one embodiment, DATAFABRIC® Manager (DFM) software, a storage management software application commercially available from Appliance Inc. of Sunnyvale, Calif. to manage a distributed storage infrastructure, is the data collector 420. DFM has several advantageous features that can be utilized for data collection and other functions of the support console 23. For instance, DFM has the ability to collect data, such as trend information, regarding a storage server 20.

The data collector 420 can also monitor the storage server 20. In one embodiment, the monitoring comprises comparing collected data to threshold data and sending a notification to the device relationship manager 440 in case a comparison indicates an event has occurred or is about to occur. Further, data collector 420 can be used to detect and send notifications in case of storage server 20 failure. In one embodiment, the data collector 420 causes an email notification to be sent to a configurable list of email addresses belonging to users at the remote administrative console 22. The data collector 420 can be also manage and archive sent notifications.

Figure 6:
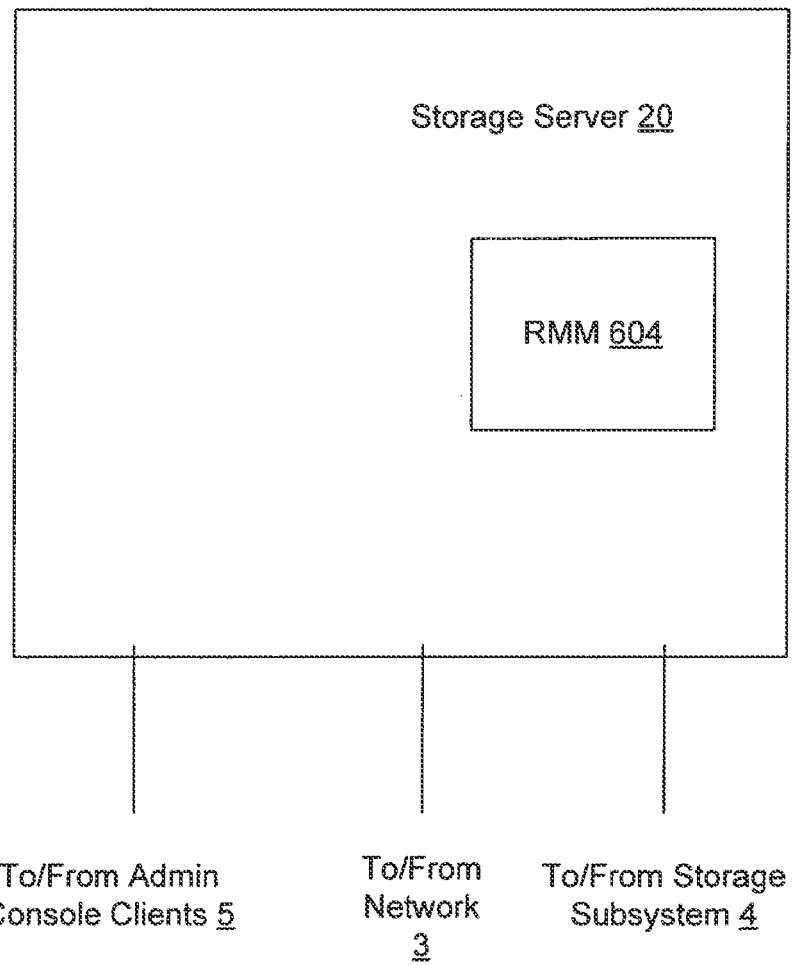
FIG. 6 illustrates a Remote Management Module inside a storage server.

In one embodiment of the present invention, the data collector 420 detects a device called a remote management module (RMM) 604 incorporated into the storage server 20 to enable remote management of the storage server 20. The RMM is typically in the form of a dedicated circuit card separate from the other elements of the host storage server 20, as shown in FIG. 6, and includes control circuitry (e.g., a microprocessor or microcontroller) which is programmed or otherwise configured to respond to commands received from an administrator via a network, to perform some management functions on the storage server 20. The RMM can be used to perform such management functions as to cause the storage server 20 to store an image of a process, to remotely power the storage sewer in case of storage server 20 failure.

Thus, according to one embodiment of the present invention, the data collector 420 provides the remote administrative console 22 with administrative access to the RMM on the storage server 20. In one embodiment, the data collector 420 stores authentication information, such as user name and passwords, to log on to the RMM as an administrator, and thus to authenticate and provide access to the remote administrative console 22. In this way, the support console 23 extends the benefits of the RMM to the remote administrative console 22. This is advantageous in that it provides the remote administrative console 22 with greater access to the storage sewer 20.

The data collector 420 can also advantageously utilize "autosupport" notifications from the storage serve 20. Storage servers manufactured by Network Appliance, Inc. have the capability of sending autosupport notifications, such as via email or Hypertext Transport Protocol (HTTP) or Hypertext Transport Protocol (Secure) (HTTPS), on a periodic basis, e.g., weekly. Autosupport notifications may include data associated with the health of the storage serve 20 and may include data associated with any problems detected by the storage server 20. In one embodiment of the invention, the data collector 420 makes monitored processing systems, such as storage server 20, send data collection autosupport notifications to the remote administrative console 22 more frequently or as required by the remote administrative console 22, e.g., daily. In one embodiment of the invention, the data collector 420 is configured, upon detection of hardware issues with the storage sever 20, to notify a provider of hardware to dispatch replacement parts.

The support console 23 also communicates with the storage sever 20, for instance by using the data collector 420, to move a core file at the storage sever 20. A core file is created at the storage server 20 when there is an error or problem at the storage server 20, such as when the storage server 20 fails or when a program aborts abnormally, and contains a dump of the storage server's core memory at that time. Core files are very useful in debugging the problem as they provide an image of the process that failed at the time of failure. Accordingly, the support console 23 provides the core files to a remote debugging client at the remote administrative console 22.

In one embodiment, the support console 23 includes a remote core processor 470 to manage access to a core file of the storage server 20 by the remote debugging client. In one embodiment, the remote core processor 470 is a daemon. Accordingly, the remote core processor 470 sits idly in the background until it is invoked by the remote administrative console 22 to perform its task. As is well known in the art, the core file is a binary image of the storage server 20 runtime. The remote core processor 470 fetches desired chunks of the core file from the data collector 420 and delivers them to the remote administrative console 22. In one embodiment, the remote core processor 470 is programmed to understand core file layout, such that it is able to identify and collect the chunks of the core that are requested by the remote administrative console 22 and send just those portions, instead of sending the complete core file, which can be up to several gigabytes in size.

In one embodiment of the present invention, the remote core processor 470 receives information about the location and size of a desired chunk of the core file from a GNU Project debugger (GDB) at the remote administrative console 22. GDB is source level debugger that allows a user to see what is going on inside another program while it executes, or what another program was doing at the moment it crashed. The remote core processor 470 uses the received information to collect the portions of the core that are requested by the remote administrative console 22. The remote core processor 470 can be implemented using a set of Perl files and processes. It is to be noted that other scripting languages may also be used.

The remote core processor 470 can send the chunks of the core file directly to the remote administrative console 22. Alternatively, for greater security of the core file data, the appropriate portions of the core file are sent to the remote administrative console 22 via a tunneled mode through a secure communication pathway, as described below.

Figure 7:
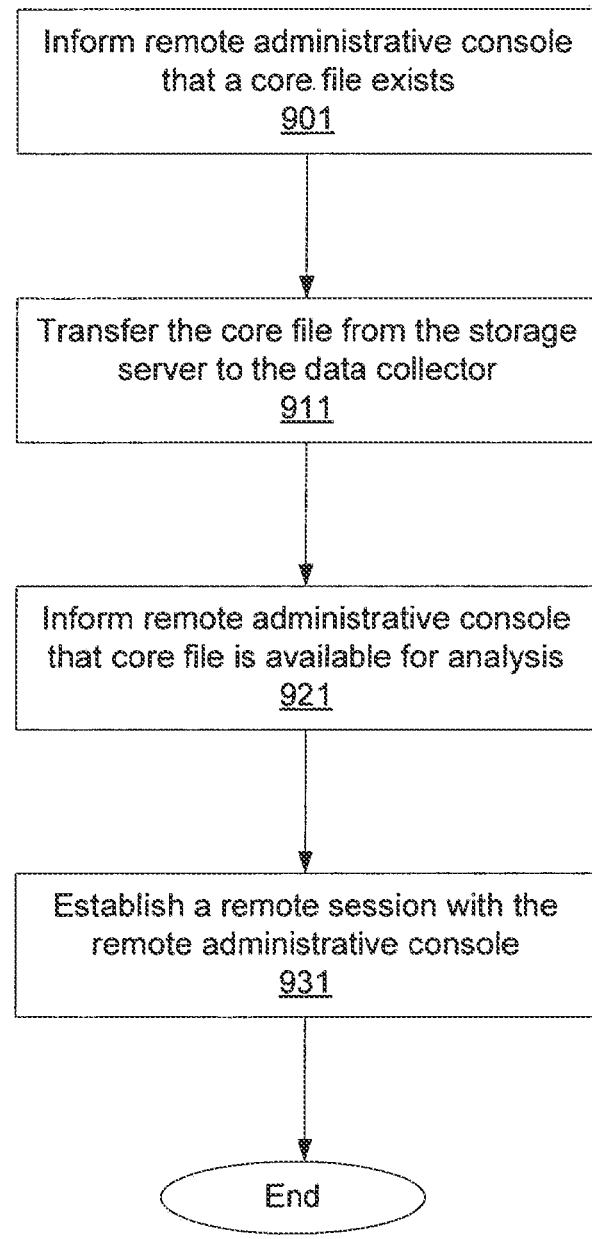
FIG. 7 is a flow diagram of the support console supporting core file analysis by the remote administrative console.

FIG. 7 is a flow diagram of the support console 23 supporting core file analysis by the remote administrative console 22. At block 901, the support console 23 assists in informing the remote administrative console 22 that a core file exists. For instance, the support console 23 may execute scripts in response to commands from the remote administrative console 22, as described below, to determine that a core file exists. At bock 911, the device relationship manager 440 runs scripts to transfer the core file from the storage server 20 to the data collector 410 in response to a command from the remote administrative console 22. At block 921, the device relationship manager 440 sends data back to the remote administrative console 22 indicating the core file is available for analysis. At block 931, the support console 23 helps establishes a remote session with the remote administrative console 22. In one embodiment, the remote session is established upon receiving a command from the remote administrative console 22. Further, the device relationship manager 440 may contain code to establish a remote session with the remote administrative console 22 to allow transmission data directly through the SSL tunnel without having the data interpreted by the device relationship manager 440. Upon establishment of the remote session, the support engineer 530 can debug the core the remotely. In one embodiment, the support engineer 630 use a GDB session to debug the core file.

In one embodiment of the invention, the device relationship manager 440 is configured to communicate with the remote administrative console 22 via a network. Upon receiving notification of an event from the data collector 420, the device relationship manager 440 packages the data received from the data collector 420 associated with the event in a protocol format appropriate for sending it back to the remote administrative console 22, such as in a format suitable for SSL.

The device relationship manager 440 may also send messages back to the remote administrative console 22 as an indication of the status of the monitored processing systems, such as storage server 20. In one embodiment, the monitored processing systems may include the support console 23 itself and/or other support consoles connected to network 3.

Figure 8A:
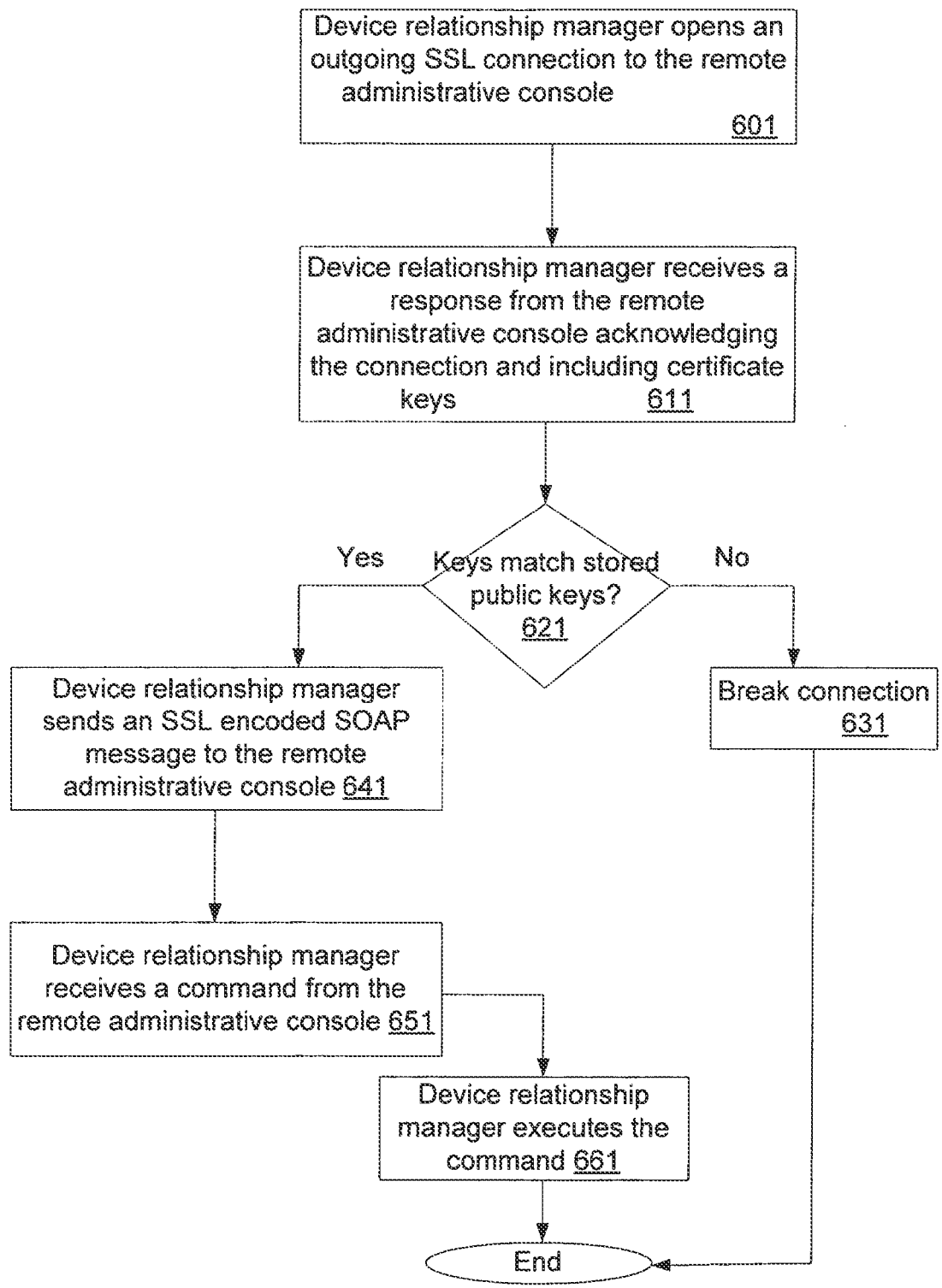
FIG. 8A is a flow diagram of a communication routine executed between the support console and the remote administrative console.

FIG. 8A is a flow diagram of a communication routine executed between the support console 23 and the remote administrative console 22 to send heartbeat communications to the remote administrative console 22. At block 601, the device relationship manager 440 opens an outgoing SSL connection to the remote administrative console 22. At block 611, the device relationship manager 440 receives a response from the remote administrative console 22 acknowledging the connection and including certificate keys. At block 621, the device relationship manager 440 determines if the certificate keys match stored public keys. If there is no match, the device relationship manager 440 breaks the connection at block 631. Otherwise, at block 641, the device relationship manager 440 sends an SSL-encoded SOAP message to the remote administrative console 22. SOAP is a protocol for information exchange. In one embodiment, the message includes changed data items for monitored processing systems. At block 651, the device relationship manager 440 receives a command from the remote administrative console 22. In one embodiment, the remote administrative console 22 sends a command after receiving, decoding, and processing the message to determine if any action is needed. At block 661, the device relationship manager 440 executes the command if approved by the Security Policy Manager 430, as described below.

The device relationship manager 440 handles communications between the support console 20 and the remote administrative console 22 through a secure service communications channel/connection. In one embodiment, the secure service communications channel/connection is a SSL connection. Accordingly, the device relationship manager 440 packages data received from the data collector 420 into a format suitable for transmission via the SSL connection. Further, the device relationship manager 440 may include the ability to provide scalable transport of bulk data from data collector 420 to the remote administrative console 22 via XML bundled files. In one embodiment, this functionality is implemented by a scalability parser on the remote administrative console 22 side.

In one embodiment, the device relationship manager 440 may further include functionality to help transmit data through the secure service communications funnel without interpreting the data. For instance, core file chunks created by the remote core processor 470 do not need further packaging, and can be funneled to the remote administrative console 22 via the secure SSL tunnel. Also, during remote sessions invoked by the remote administrative console 22, the device relationship manager 440 may enable communication between the remote administrative console 22, the support console 23 and the storage server 20 without interpretation.

The device relationship manager 440 also receives commands from the remote administrative console 22 and interprets these commands. The device relationship manager 440 is configured to interpret the commands to run scripts on the support console 23. The scripts may be accessed from a script file 460 or may be included in the command received from the remote administrative console 22. Accordingly, the device relationship manager 440 may run scripts to mine data from the data collector 420 prior to transmission back to the remote administrative console 22. Furthermore, the device relationship manager 440 may also be configured to run general infrastructure scripts on a periodic basis or at specified time to perform such tasks as, copying core files from a designated storage server 20, moving or renaming core files into standard access locations, and so on.

In one embodiment, the support console 23 provides the remote administrative console 22 with mediated remote access to the storage server 20 for troubleshooting. The support console 23 mediates a command line session, on the support console or the storage server 20 that is initiated by a user of the storage server 20 and joined by a support engineer at the remote administrative console 22, thus providing ushered remote access to the remote administrative console 22. In one embodiment, a user of storage server 20 logs a support engineer at the remote administrative console 22 on to the storage server 20. The support engineer 530 at the remote administrative console 22 types commands to debug. In one embodiment, the support engineer 530 at the remote administrative console 22 types commands via a remote session directly to the storage server 20 if serial port access is configured. In another embodiment, the support engineer 530 at the remote administrative console 22 types commands via a remote desktop session where the customer logs into various machines. Such ushered access ability is advantageous in that it enables the user of the processing system to allow the support engineer 530 at the remote administrative console 22 to carry out full session diagnostic and troubleshooting operations on the processing system without having to provide the support engineer 530 an account or disclosing confidential login information.

In accordance with certain embodiments of the invention, a security policy manager 430 controls actions by the device relationship manager 440 and the remote administrative console 22. In one embodiment of the invention, security policy manager 430 is used to set up appropriate policies and permissions of a user of the storage server 20. Accordingly, actions by the device relationship manager 440 are covered by security policies that are sat by the user of the storage server 20. This results in enhanced security since only permitted data regarding the storage server 20 can be collected and transmitted to the remote administrative console 22. Furthermore, only permitted operations can be performed on the storage server 20. Accordingly, in one embodiment, the policy manager 430 is responsible for intercepting all actions by the device relationship manager 440. Further, the policy manager 430 is responsible for checking the intended actions on storage server 20, such as troubleshooting, by the remote administrative console 22 against the policies for resolution.

In accordance with certain embodiments of the invention, the security policy manager 430 is defined to implement policies established by a user, e.g. administrator 5, of the storage server 20. In one embodiment, the user may designate three types of policies: Always Allow, Always Deny, or Always Ask. Thus if the intended action by the remote administrative console 22 is designated "Always Ask", then the policy manager 430 causes administrator/user 5 of the storage server 20 to be notified. For instance, a designated administrator/user, such as a network administrator using administrative console 5, may be sent an email for approval of the intended action. Accordingly, approval must be given by the designated administrator/user before the action is acted upon.

Figure 8B:
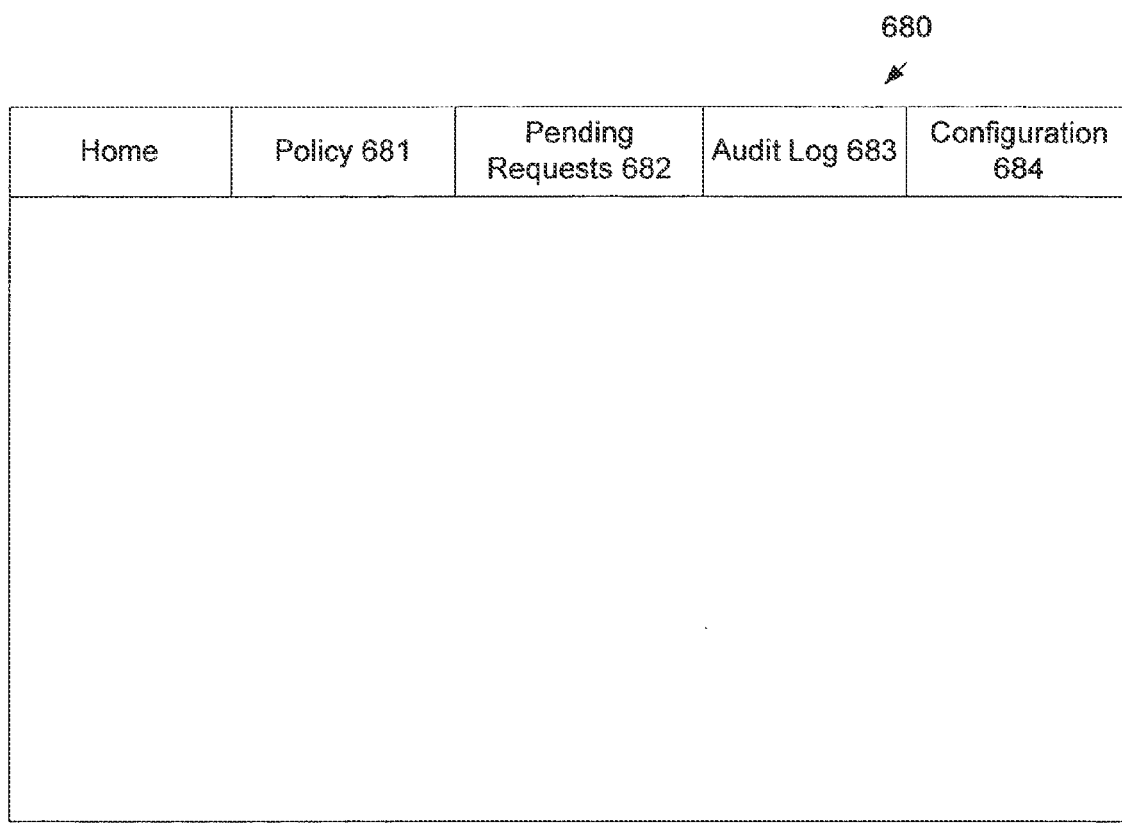
FIG. 8B illustrates a security policy manager web interface.

In one embodiment, approval is given via a web interface 680, as illustrated by FIG. 8B, which is normally displayed on a system, such as a system associated with the remote administrative console 22. The web interface 680 contains a tab 681 to display policy page, which displays a table of all permissions set for one or more processing systems, and enables a user of the web interface 680 to view and change the policy settings. The web interface 680 also contains a tab 682 to display a table of all requests waiting approval for one or more processing systems. The we interface 680 also contains a tab 683 to display a table of all audit messages generated by the security policy manager 430. The web interface 680 further contains a tab 684 to display a page to enable configuration of who receives notifications from the security policy manager 430.

Specific security policies can apply globally, e.g. to all processing systems monitored by the support console 23, or to individual processing systems, or to group of processing systems. In one embodiment, a security policy is defined using several fields, including general type of action requested by the device relationship manager 440, the specific action requested by the device relationship manager 440, any parameters associated with the request, the access right, the inheritance specifying the parent group to which the targeted processing system belongs, and so on.

Figure 9:
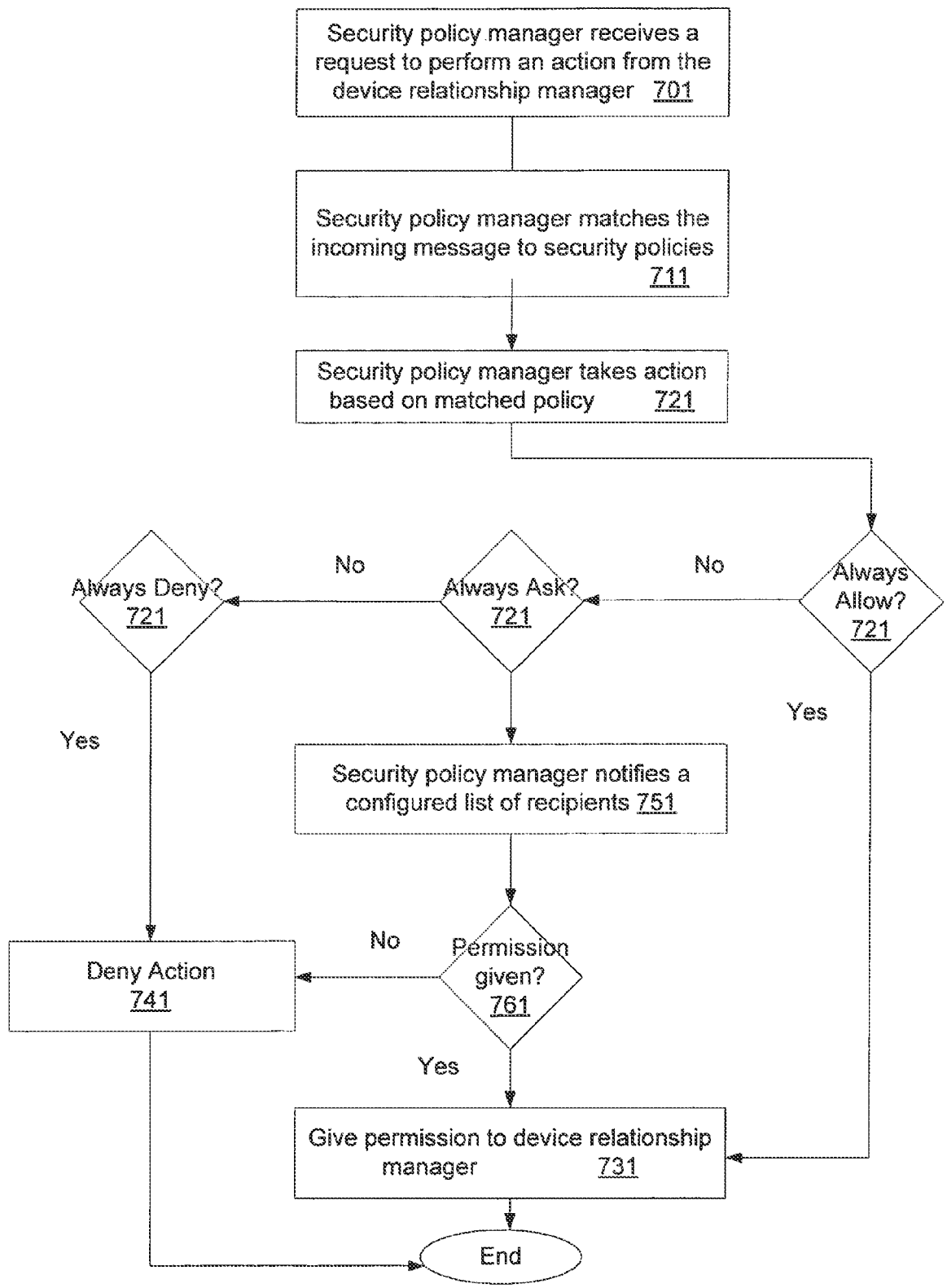
FIG. 9 is a flow diagram of a sample process followed by the security policy manager.

FIG. 9 is a flow diagram of a sample process followed by the security policy manager 430. At block 701, the security policy manager 430 receives a SOAP message that is a request to perform an action from the device relationship manager 440. In one embodiment, the message contains the action name (e.g., "Run Script"), action parameters (e.g., script name), and target device identification information (e.g., storage server 20). At block 711, the security policy manager 430 matches the incoming message to the security policies based on the target device information, action category, action parameters, and so on. At block 721, the security policy manager 430 takes action based on the access rights configuration for the matched security policy. Accordingly, if the access right is "always allow", the permission is returned to the device relationship manager 440 at block 731. If the access right is "always deny", the refusal is returned to the device relationship manager 440 at block 741. If the access right is "always ask", the security policy manager 430 emails notifications to a configured list of recipients at block 751. In one embodiment, the security policy manager 430 encodes the body of the email based on the request details. At block 761, the security policy manager 430 enables recipient of the email notification to log on to the security policy manager, for instance, via a web interface. The security policy manager 430 sends a response (allow or deny) to the device relationship manager 440. If the action is permitted, security policy manager 430 sends response and the process goes to block 731. Otherwise, the process goes to block 741. In one embodiment, if there is no response from the recipients within a configurable time, the security policy manager 430 denies the request.

In one embodiment of the present invention, the support console 23 implements robust security features. For instance, the support console 23 may include a firewall 410 to prevent unauthorized access to the support console 23. Further, the support console 23 may support various protocols including Hyper Text Transfer Protocol (secure) (HTTPs), Secure Shell Protocol (SSH), Socket Secure (SOCKS) Protocol, Secure Sockets Layer (SSL), and so on. In one embodiment, for additional security, the support console 23 may communicate with the remote administrative console 22 via SSL. In one embodiment, communication between the support console 23 and remote administrative console 22 may be tunneled through a proxy. The support console 23 may, for example, communicate with a storage server 20 or a NETCACHE® appliance via SNMP, SSH, or RSH; with a SAN Host 20 via HTTP; or with a network switch via SNMP; and so on.

In one embodiment of the present invention, the firewall 410 is customized to identify each type of processing system (such as storage server, switch, NETCACHE®, SAN host, and so on) and open the ports necessary for communication. Accordingly, in one embodiment, a separate CLI is invoked for each type of processing system monitored. For instance, a sample CLI command for a storage server 20 could be "host add" and for a NETCACHE® could be "netcache add". Accordingly, each CLI invocation reconfigures the firewall 410 for a set of valid ports and protocols based on template specific to the type of processing system currently being monitored.

Alternatively, the data collector 420 is used to identify a processing system to be monitored and to open the necessary ports to communicate with the processing system. Accordingly, only a single CLI command is necessary to connect with any processing system. For instance, a sample CLI command for a processing system could be "monitor add". Upon connection with the processing system, DFM identifies the processing system to as a storage server 20, a network caching appliance, a switch, or whatever the case may be. The support console 23 then reconfigures the firewall 410 for the identified processing system, thus enabling DFM specific firewall configuration for the processing system to be deleted.

In one embodiment, the support console 23 provides multiple user interfaces. One user interface, as mentioned above, is the CLI. In one embodiment, a user can enter commands at the support console 23 command line from one of a system connected directly to a serial port of the support console 23, a client that can access support console 23 through PuTTY or a similar program, or a Unix client that can access the support console 23 using an SSH connection. PuTTY is an SSH, Telnet rlogin, and raw TCP client. Another user interface may be a web-based user interface provided for the security policy manager 430, as shown in FIG. 8B.

Figure 10:
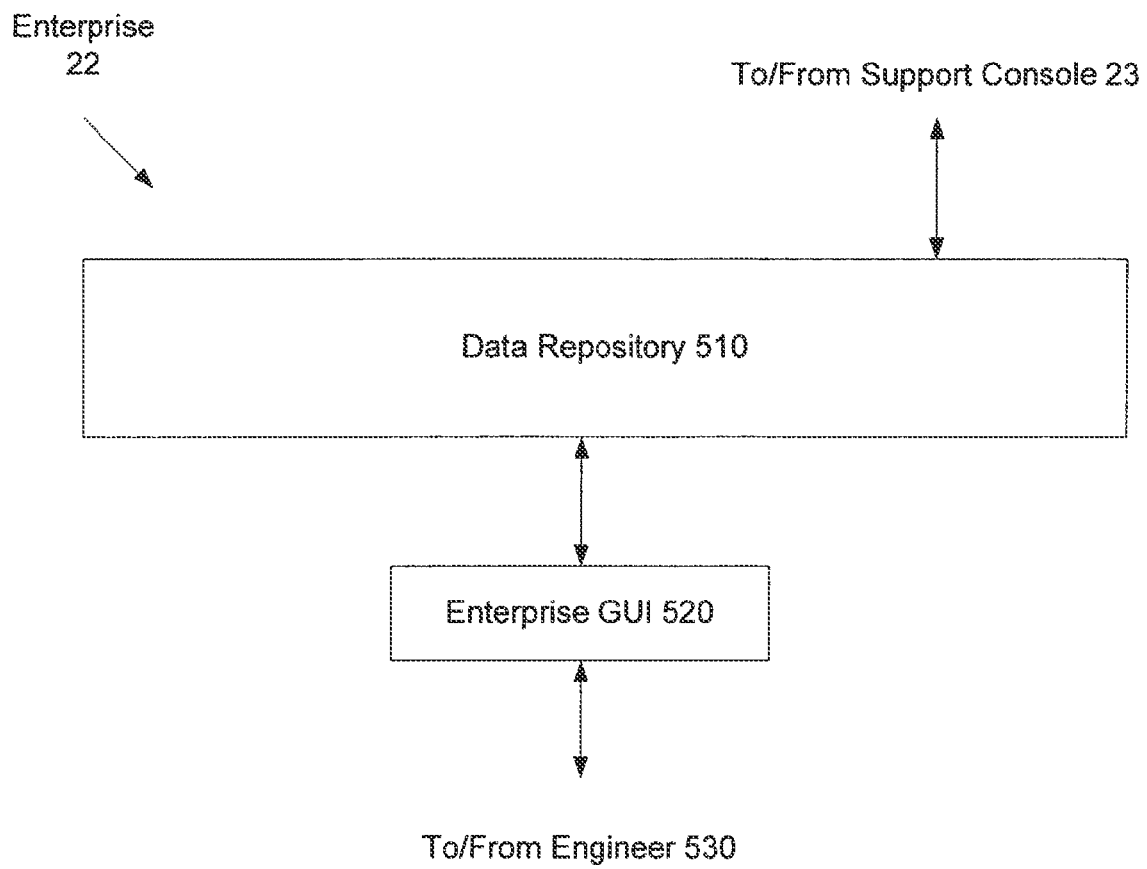
FIG. 10 is a block diagram showing components of the remote administrative console.

FIG. 10 is a high-level block diagram showing the relevant components of the remote administrative console 22, according to certain embodiments of the invention. The remote administrative console 22 has a data repository 510 to store data received from the support console 23, such as data on monitored parameters and functions and core files. In one embodiment, the data is stored in the data repository 510 securely behind a firewall. In one embodiment, the remote administrative console 22 also includes a Graphical User Interface (GUI) 520 to provide a user with access to the data repository 510. Further, GUI 520 is also the access mechanism for an support engineer 530 to communicate with the device relationship manager 440.

Figure 11:
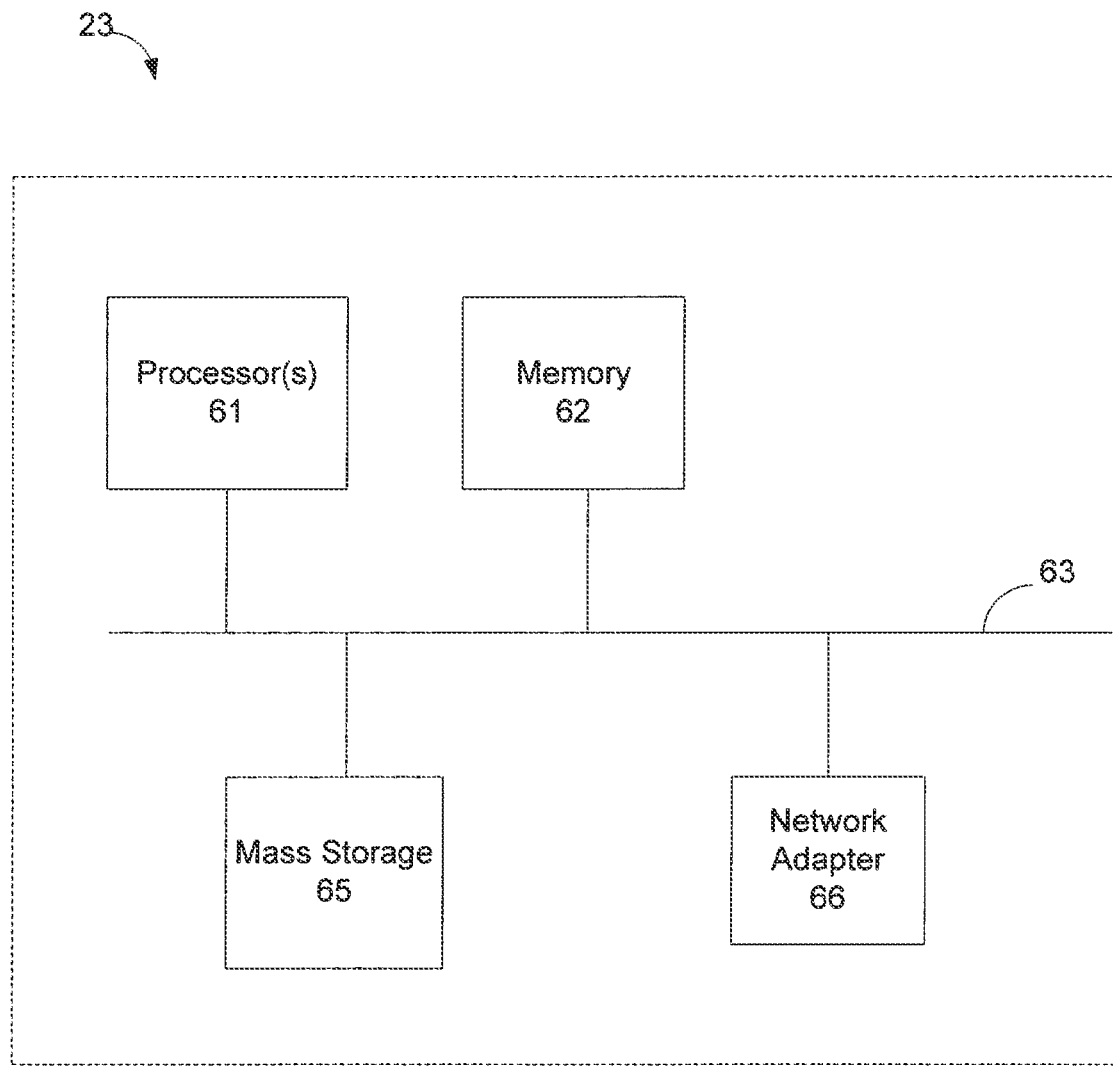
FIG. 11 is a high-level block diagram showing an example of the architecture of a support console.

As indicated above, the techniques introduced herein can be implemented in software, either in whole or in part. FIG. 11 is a high-level block diagram showing an example of the architecture of a support console 23, at a high level, in which such software can be embodied. Note that certain standard and well-known components which are not germane to the present invention are not shown.

The support console 23 includes one or more processors 61 and memory 62, coupled to a bus system 63. The bus system 63 shown in FIG. 11 is an abstraction that represents any one or more separate physical buses and/or point-to-point connections, connected by appropriate bridges, adapters and/or controllers. The bus system 63, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 61 are the central processing units (CPUs) of the processing system 60 and, thus, control its overall operation. In certain embodiments, the processors 61 accomplish this by executing software stored in memory 62. A processor 61 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 62 represents any form of random access memory (RAM), read-only memory (ROM), flash memory, or the like, or a combination of such devices. Memory 62 includes the main memory of the processing system 60. Memory 62 may store software which implements the techniques introduced above.

Also connected to the processors 61 through the bus system 63 are one or more internal mass storage devices 65, and a network adapter 66. Internal mass storage devices 65 may be or include any conventional medium for storing large volumes of data in a non-volatile manner, such as one or more magnetic or optical based disks. The network adapter 66 provides the processing system 60 with the ability to communicate with remote devices (e.g., storage server 20) over a network and may be, for example, an Ethernet adapter, a Fibre Channel adapter, or the like.

Thus, a secure, remotely accessible monitoring and management station that enables automated and manual troubleshooting of a processing system has been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method performed by a remote computing system, comprising:
   sending, from the remote computing system to a support console, a certificate key to establish a connection between the remote computing system and the support console, wherein the certificate key matches a public key stored at the support console;
   sending, from the remote computing system to the support console, a command to access a core file, wherein a processing system of a data storage system generates the core file, the core file including a dump of core memory of the processing system made in response to an anomaly event that occurred at the processing system;
   sending, from the remote system to the support console, a requested size of a portion of the core file, wherein the requested size is determined based on the command to access the core file;
   receiving, at the remote system from the support console, at least the portion of the core file in response to the sent command; and
   analyzing, at the remove system, the portion of the core file for identifying information regarding the anomaly event that occurred at the processing system.

2. The method of claim 1, further comprising:
   receiving, from the support console, a message indicating the anomaly event that occurred at the processing system.

3. The method of claim 1, further comprising:
   sending, from the remote system to the support console, an instruction to perform a debugging operation on the core file at the support console in cooperation with a debugger of the remote system.

4. The method of claim 1, further comprising:
   sending, from the remote computing system to the support console, a request to access further data of the core file.

5. The method of claim 1, further comprising:
   receiving, at the remote system from the support console, information regarding operation of the processing system.

6. The method of claim 1, wherein the sending of the command comprises:
   sending, from the remote computing system to the support console, the command to access the core file, wherein the command conforms to a security policy governing communications between the remote computing system and the support console.

7. The method of claim 6, wherein the security policy is established by a user of the processing system.

8. The method of claim 1, wherein the processing system is a storage server, a SAN host, a switch, a network caching appliance, a host bus adapter or a Fabric Attached Storage (FAS) device.

9. A non-transitory machine-readable storage medium having stored thereon instructions for performing a method by a remote computing system, comprising machine executable code which when executed by at least one machine, causes the machine to:
   send from the remote computing system to a support console, a certificate key to establish a connection between the remote computing system and the support console, wherein the certificate key matches a public key stored at the support console;
   send from the remote computing system to the support console, a command to access a core file, wherein a processing system of a data storage system generates the core file, the core file including a dump of core memory of the processing system made in response to an anomaly event that occurred at the processing system;
   send from the remote system to the support console, a requested size of a portion of the core file, wherein the requested size is determined based on the command to access the core file;
   receive at the remote system from the support console, at least the portion of the core file in response to the sent command; and
   analyze at the remove system, the portion of the core file for identifying information regarding the anomaly event that occurred at the processing system.

10. The non-transitory machine-readable storage medium of claim 9,
    wherein the machine executable code further causes the machine to:
    Receive from the support console, a message indicating the anomaly event that occurred at the processing system.

11. The non-transitory, machine-readable storage medium of claim 9,
    wherein the machine executable code further causes the machine to:
    send from the remote system to the support console, an instruction to perform a debugging operation on the core file at the support console in cooperation with a debugger of the remote system.

12. The non-transitory machine-readable storage medium of claim 9, wherein the machine executable code further causes the machine to:
send from the remote computing system to the support console, a request to access further data of the core file.

13. The non-transitory machine-readable storage medium of claim 9,
wherein the machine executable code further causes the machine to:
receive at the remote system from the support console, information regarding operation of the processing system.

14. The non-transitory machine-readable storage medium of claim 9,
wherein the sending of the command comprises:
sending from the remote computing system to the support console, the command to access the core file, wherein the command conforms to a security policy governing communications between the remote computing system and the support console.

15. A system, comprising:
a memory containing machine readable medium comprising machine executable code having stored thereon instructions; and a processor module coupled to the memory execute the machine executable code to:
send from the remote computing system to a support console, a certificate key to establish a connection between the remote computing system and the support console, wherein the certificate key matches a public key stored at the support console;
send from the remote computing system to the support console, a command to access a core file, wherein a processing system of a data storage system generates the core file, the core file including a dump of core memory of the processing system made in response to an anomaly event that occurred at the processing system;
send from the remote system to the support console, a requested size of a portion of the core file, wherein the requested size is determined based on the command to access the core file;
receive at the remote system from the support console, at least the portion of the core file in response to the sent command; and
analyze at the remove system, the portion of the core file for identifying information regarding the anomaly event that occurred at the processing system.

16. The system of claim 15, wherein the machine executable code further causes the machine to:
receive from the support console, a message indicating the anomaly event that occurred at the processing system.

17. The system of claim 15, wherein the machine executable code further causes the machine to:
send from the remote system to the support console, an instruction to perform a debugging operation on the core file at the support console in cooperation with a debugger of the remote system.

18. The system of claim 15, wherein the machine executable code further causes the machine to:
send from the remote computing system to the support console, a request to access further data of the core file.

19. The system of claim 15, wherein the machine executable code further causes the machine to:
receive at the remote system from the support console, information regarding operation of the processing system.

20. The system of claim 15, wherein the sending of the command comprises:
sending from the remote computing system to the support console, the command to access the core file, wherein the command conforms to a security policy governing communications between the remote computing system and the support console.

* * * * *